United States Patent
Murphy et al.

(10) Patent No.: US 8,888,050 B1
(45) Date of Patent: Nov. 18, 2014

(54) LAUNCH VEHICLE PAYLOAD INTERFACE SYSTEMS AND METHODS

(75) Inventors: Gerald Bernard Murphy, Conifer, CO (US); Wayne Carl Boncyk, Evergreen, CO (US)

(73) Assignee: Design_Net Engineering, LLC, Golden, CO (US)

( * ) Notice: Subject to any disclaimer, the term of this patent is extended or adjusted under 35 U.S.C. 154(b) by 148 days.

(21) Appl. No.: 13/397,589

(22) Filed: Feb. 15, 2012

Related U.S. Application Data (60) Provisional application No. 61/457,262, filed on Feb. 15, 2011.

(51) Int. Cl.
*B64G 1/00* (2006.01)

(52) U.S. Cl.
USPC ........................................ 244/173.3

(58) Field of Classification Search
USPC ........................... 244/173.3, 173.1
See application file for complete search history.

(56) References Cited

U.S. PATENT DOCUMENTS

| | | | |
|---|---|---|---|
| 5,271,582 A | 12/1993 | Perkins et al. | |
| 6,845,949 B2 | 1/2005 | Blackwell-Thompson et al. | |
| 7,093,805 B2 * | 8/2006 | Blackwell-Thompson et al. | 244/173.1 |
| 2004/0016852 A1 * | 1/2004 | Blackwell-Thompson et al. | 244/158 R |
| 2004/0124312 A1 * | 7/2004 | Mueller et al. | 244/150 |
| 2004/0188562 A1 * | 9/2004 | Mueller et al. | 244/10 |
| 2004/0245399 A1 * | 12/2004 | Blackwell-Thompson et al. | 244/150 |

OTHER PUBLICATIONS

Szatkowski, J. United Launch Alliance, EELV Secondary Payload Accommodations. CubeSat Workshop, Apr. 10, 2008, 11 pages.

\* cited by examiner

*Primary Examiner* — Philip J Bonzell
(74) *Attorney, Agent, or Firm* — Lathrop & Gage LLP (57) ABSTRACT

A system and method interface one or more secondary payloads to a launch vehicle. A Multiple Interface Payload Subsystem (MIPS) is configured with one or more circuit boards to provide a secondary payload interface for each of the one or more secondary payloads. The MIPS couples with the launch vehicle using a single launch vehicle interface that provides communication and power from avionics of the launch vehicle. Each of the secondary payloads couples to one of the secondary payload interfaces. The MIPS provides communication and power from the launch vehicle to each of the secondary payloads via the single launch vehicle interface and a respective one of the secondary payload interfaces.

10 Claims, 5 Drawing Sheets

LAUNCH VEHICLE PAYLOAD INTERFACE SYSTEMS AND METHODS

RELATED APPLICATIONS

This application claims priority to Provisional Patent Application Ser. No. 61/457,262, filed Feb. 15, 2011, and incorporated herein by reference.

BACKGROUND

Traditionally, launch vehicles have carried one or two relatively large "primary" payloads to orbit with a lot of unused payload volume, because it is impractical to custom build a new launch vehicle (e.g., a rocket) for each payload to be launched into orbit. It has become usual practice within the satellite industry to pick a suitable launch vehicle that can carry just a bit more total mass and more total volume than is taken up by the primary payload(s) from a launch vehicle "shopping list." The extra capacity of the launch vehicle is often called launch margin.

It is not desirable to waste the unused carrying capacity of the launch vehicle, and various schemes to take advantage of that extra capacity to carry one or more "secondary payloads," have been devised to provide opportunities to launch small, inexpensive space missions. That is, these small inexpensive space missions rely on the ability to add "secondary payloads" on large launch vehicles to take advantage of unused lift capacity that may exist on a given launch vehicle once the needs of the primary payload have been met.

Conventional systems for incorporating one or more secondary payloads within a launch vehicle typically rely upon one or more dedicated special purpose deployment and avionics support boxes that are custom designed and fabricated on a per mission (i.e., per launch) basis. Custom design, fabrication, and integration of the special purpose deployment and avionics support boxes, however, is a costly (both in time and money) solution that conventionally must be repeated or recreated for each such launch. Each secondary payload also typically requires a unique set of launch vehicle services and interfaces. Development of payload-specific interface controls and definitions for each payload is time consuming and expensive for secondary payload mission programs.

For example, each secondary payload requires one or more services from the launch vehicle, such as (a) power for one or both of operations while attached to the secondary carrier and battery trickle charging prior to being deployed from the launch vehicle, (b) command and data handling, (c) deployment activation, and (d) video monitoring. Each secondary payload must therefore be integrated and tested with the launch vehicle prior to launch, which adds significant cost and time to preparation of the launch vehicle.

SUMMARY OF THE INVENTION

In an embodiment, a method interfaces one or more secondary payloads to a launch vehicle. A Multiple Interface Payload Subsystem (MIPS) is configured with one or more circuit boards to provide a secondary payload interface for each of the one or more secondary payloads. The MIPS couples with the launch vehicle using a single launch vehicle interface that provides communication and power from avionics of the launch vehicle. Each of the secondary payloads couples to each secondary payload interface. The MIPS provides communication and power from the launch vehicle to each of the secondary payloads via the single launch vehicle interface and a respective secondary payload interface.

In another embodiment, a system interfaces a launch vehicle to one or more secondary payloads. The system includes a single consistent launch vehicle interface for coupling with the launch vehicle to receive power, provide command and data communication, and receive a single deployment signal. For each of the one or more secondary payloads, the system includes a secondary payload interface for providing power to, receiving telemetry from, the secondary payload. The single consistent launch vehicle interface is invariant irrespective of the number of secondary payloads.

In another embodiment, a method interfaces one or more secondary payloads to a launch vehicle. A Multiple Interface Payload Subsystem (MIPS) is couples to a single consistent launch vehicle interface to receive power, communicate commands and data, and receive a single deployment signal. Each of the one or more secondary payloads is couples to a different secondary payload interface of MIPS. The MIPS is configured to support each of the one or more secondary payloads from the single consistent launch vehicle interface, and the one or more payloads are deployed using a predefined sequence and schedule in response to the single deployment signal.

DETAILED DESCRIPTION OF THE EMBODIMENTS

With a novel departure from the traditional time consuming process of developing individual spacecraft hosting solutions as summarized above, a Multiple Interface Payload Subsystem (MIPS) has a reconfigurable family of electronics boards, a common chassis interface, and a set of configurable firmware and software that supports a variety of needs related to the integration, flight, and/or deployment of secondary payloads (also known as auxiliary payloads) on a launch vehicle (LV) such as one of FALCON class and Evolved Expendable Launch Vehicle (EELV) class rockets, for example.

Figure 1:
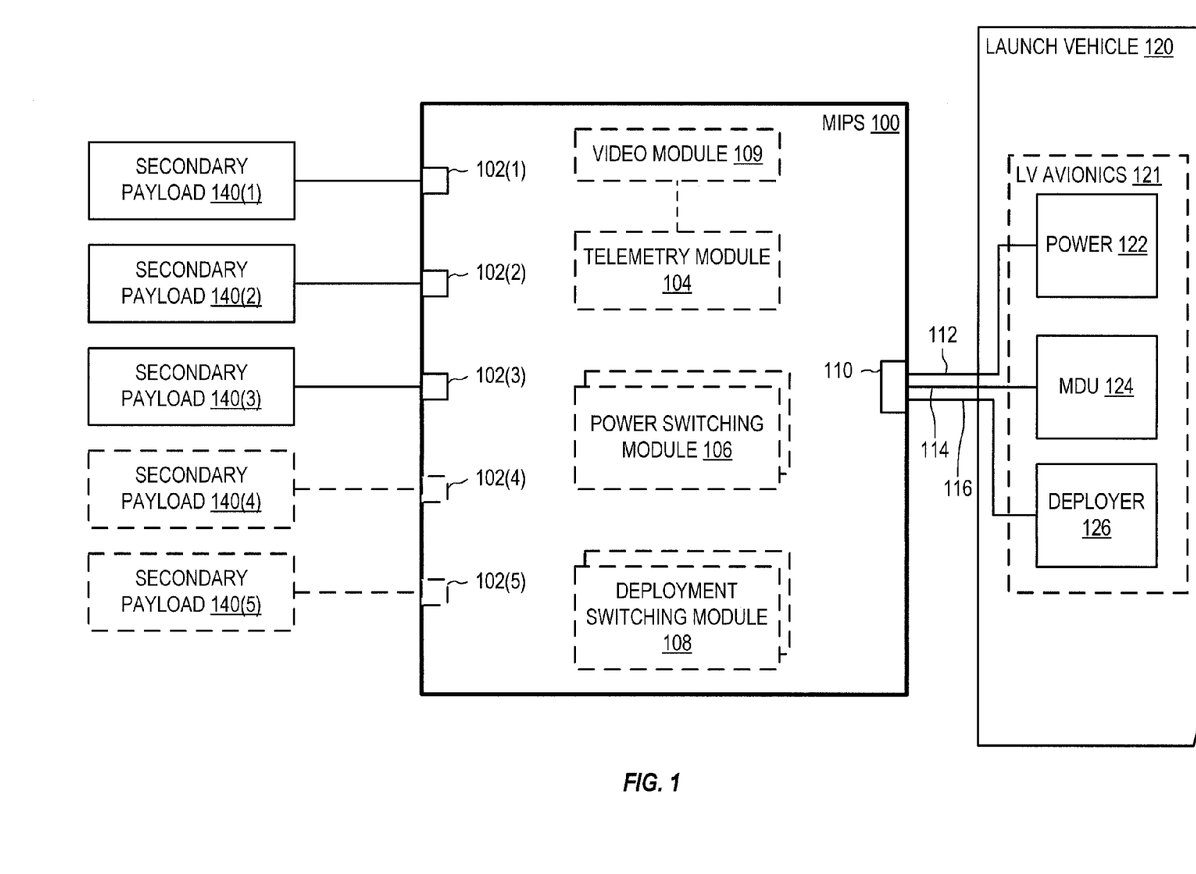
FIG. 1 shows an example of a Multiple Interface Payload Subsystem (MIPS) for interfacing at least one secondary payload with a launch vehicle, in an embodiment.

FIG. 1 shows an example of MIPS 100 for interfacing at least one secondary payload 140 with an LV 120, in an embodiment. MIPS 100 may include a standard LV interface 110 for coupling with LV 120 that may remain unchanged for any number and type of secondary payloads 140 that may connect to MIPS 100. LV interface 110 represents a constant electrical interface that may include one or more of connectors, cables, mounting points, and so on. The use of MIPS 100 thereby facilitates integration of each secondary payload(s) 140 with LV 120 because LV interface 110 need not change.

Integration and test support of a full-up launch vehicle is a very time consuming and expensive process. Thus, if the bulk of secondary payload integration and testing can be done in advance of LV integration, and if the interfaces with that LV are already tested, verified, and unchanged, significant cost and schedule savings can be realized. Since each secondary payload 140 may interfaces only with MIPS 100, use of MIPS 100 thus allows for independent integration and test of a suite of secondary payloads prior to such secondary payloads being brought to the launch vehicle. That is, according to the present embodiments, integration and testing of secondary payload 140 with MIPS 100 may occur prior to secondary payload 140 installation within LV 120. Thus, final integration and test prior to launch is advantageously and significantly simplified according to the present embodiments.

Integration of secondary payloads with the LV may also occur late, or later, in mission process flow (i.e., mission development and preparation) by interfacing the secondary payloads to LV 120 using MIPS 100. Such later integration advantageously provides mission planners with maximum flexibility and affords significant cost and schedule savings to developers of the secondary payloads. Without the realization of such cost and time savings afforded by MIPS 100, a secondary payload would have been conventionally excluded from a LV because of the cost of the traditional, months-long integration process to configure the LV with the secondary payload.

Flexibility is still important for variation between secondary payloads 140, even though LV interface 110 to LV 120 may itself be invariant, according to an embodiment. MIPS 100 may therefore be reconfigurable using zero, one, or more telemetry modules 104, zero, one, or more power switching modules 106, and zero, one, or more deployment switching modules 108, which may be added based upon desired functionality within MIPS 100 to support the connected secondary payloads 140. By allowing for such modular reconfigurability within MIPS 100, secondary payload interfaces 102 may be provided to accommodate each individual secondary payload 140, together with flexibility in programming of secondary activities (such as deployment timing of each of the secondary payloads, data acquisition format changes unique to each secondary payload, etc.). By providing such reconfigurability within MIPS 100, and without requiring a resultant change in LV interface 110, additional changes within LV 120 to support the different secondary payloads are also not required according to the present embodiments. MIPS 100 thus advantageously abstracts variation of secondary payloads 140 from LV 120.

In an embodiment, each secondary payload interface 102 may couple to a different respective one of secondary payloads 140. For example, secondary payload interface 102(1) connects to secondary payload 140(1), secondary payload interface 102(2) connects to secondary payload 140(2), and so on. Each secondary payload interface 102 may then couple with installed modules (e.g., telemetry module 104, power switching module 106, deployment switching module 108, and video module 109) based upon desired functionality of the connected secondary payload 140.

MIPS 100 allows LV 120 to support, service, and deploy one or more secondary (auxiliary) payloads 140 by operating as a type of "multiplexer" that sends deployment commands and provide power distribution from LV interface 110 to each secondary payload 140. MIPS 100 can be a modularized electronics assembly that effectively operates to translate information between a number of independent secondary payloads 140 and LV 120. In an embodiment, LV interface 110 includes an RS-422 serial communication interface, for example, for communication between a master data unit (MDU) of LV 120 and MIPS 100.

MIPS 100 may include a telemetry module 104 that collects, collates, formats, and transmits data received from one or more secondary payloads 140 to LV 120, and/or collect data from one or more video cameras. A secondary interface (e.g., video) can be processed by a video module 109 of MIPS 100, where video data may be compressed and interleaved with other data for downlink from secondary payloads 140. That is, such collected video information may become part of the stream of data that is output through interface 114 to LV 120, where the data may then be transferred to the ground station.

MIPS 100 may also include one or more power switching modules 106 that switch overcurrent-protected power from LV 120 to one or more secondary payloads 140. The switched power may be sourced from an umbilical (e.g., for charging or operation while LV 120 is on the ground) or from LV 120 during flight. MIPS 100 may also include one or more deployment switching modules 108 for deployment of one or more secondary payloads 140 according to a pre-programmed sequence.

Deployment switching module 108 may also be configured to accommodate deployment devices used for one or more secondary payloads 140. MIPS 100 may be programmed with deployment times and sequences such that LV 120 is not burdened with some of the specifics of secondary payload 140 deployment. Thus, according to the present embodiments, LV 120 need not require hardware modification based upon the types and number of secondary payload 140. In addition to supporting flight operations and deployment, MIPS 100 may also provide a ground-umbilical interface through LV avionics 121 to support ground operations and checkout of secondary payloads 140.

In an embodiment, MIPS 100 may have a configurable structure (see configurable structure 200, FIGS. 2 and 3, for example) for hosting telemetry module 104, if included, power switching modules 106, if included, deployment switching modules 108, if included, video module 109, if included, secondary payload interfaces 102, and LV interface 110. When included, telemetry module 104, power switching module 106, deployment switching module 108, and video module 109, may be configured as a family of circuit boards that may be added, based upon desired functionality, to MIPS 100 for a particular mission. MIPS 100 may thereby be advantageously rapidly configured for any combination of secondary payloads 140 added for a particular mission. As an example, a mission that does not require switched power need not include power switching module 106 or its associated circuit board. For a mission that desires additional channels for deploying a plurality of secondary payloads 140, one or more deployment switching modules 108 could also be included, for example.

In an embodiment, MIPS 100 may implement three primary electrical interfaces with LV 120: (1) a deployment signal 116; (2) a power interface 112; and (3) a command and data interface 114. One or more of these three examples of interfaces may also be provided to each secondary payload 140, and MIPS 100 may thereby advantageously provide appropriate "translation" between each secondary payload 140 and LV 120.

Deployment Timing Interface

MIPS 100 may further include one or more deployment switching modules 108 to implement deployment of secondary payloads 140 based upon a single initiated deployment signal 116 from deployer 126 of LV 120. Deployment signal 116 indicates whether any primary payloads of LV 120 are still attached, or are safely deployed, such that secondary deployments may be initiated. MIPS 100, upon detecting transition of deployment signal 116, may initiate a deployment sequencer within deployment switching module 108 that manages the timing and sequencing of all deployment operations of secondary payloads 140 from that point onwards. Once the deployment sequence is initiated, LV 120 need not be further involved with deployment.

Power Interface

MIPS 100 receives 28 VDC power directly from LV 120. Where any one or more secondary payloads 140 requires power for applications such as battery charge, initial checkout prior to deployment, operating power in the case where they remain attached, etc., one or more power switching modules 106 are included within MIPS 100 to manage distribution of power to the respective secondary payload 140. MIPS 100 thus always has only one power interface 112 that connects to LV 120, regardless of the number of secondary payloads 140.

Command and Data Interface

In an embodiment, LV 120 may have a single, well-defined serial command and data interface 114 that connects to LV interface 110 of MPS 100. MIPS may thereby 100 capture, interleave, packetize, and ship data from one or more secondary payloads 140 to LV 120 through interface 114. According to this example, each connection to secondary payload 140 need not have a high data rate. Typically, each secondary payload 140 sends miscellaneous housekeeping parameters (voltages, currents, etc.) that are received within telemetry module 104, which is specifically programmed to handle the data from each specific secondary payload 140. That is, specifics of each secondary payload 140 are managed within MIPS 100 such that LV 120 represents a relay node, or "bent pipe," for transfer of data from MIPS 100 to a ground station.

In an embodiment of MIPS, LV 120 advantageously need only communicate with MIPS 100, and not with secondary payloads 140. LV interface 110 may thus be constant. In an embodiment, LV interface 110 has two connectors; a first connector transfers 28V power and discrete deployment signal 116, and a second connector handles command and data interface 114. Thus, to LV 120, irrespective of the number of secondary payloads 140, there can be a constant interface, with constant data formats. According to the present embodiments, LV 120 need not change elements or configurations as a result of secondary payloads 140 included for the flight. MIPS 100 may provide all necessary processing intelligence to manage every aspect of secondary payload 140 activation and deployment, and may do so locally, without need for LV 120 intervention after initiation of deployment signal 116. This advantageous configuration thus lowers cost and simplifies integration as compared with conventional systems for including secondary payloads.

Figure 2:
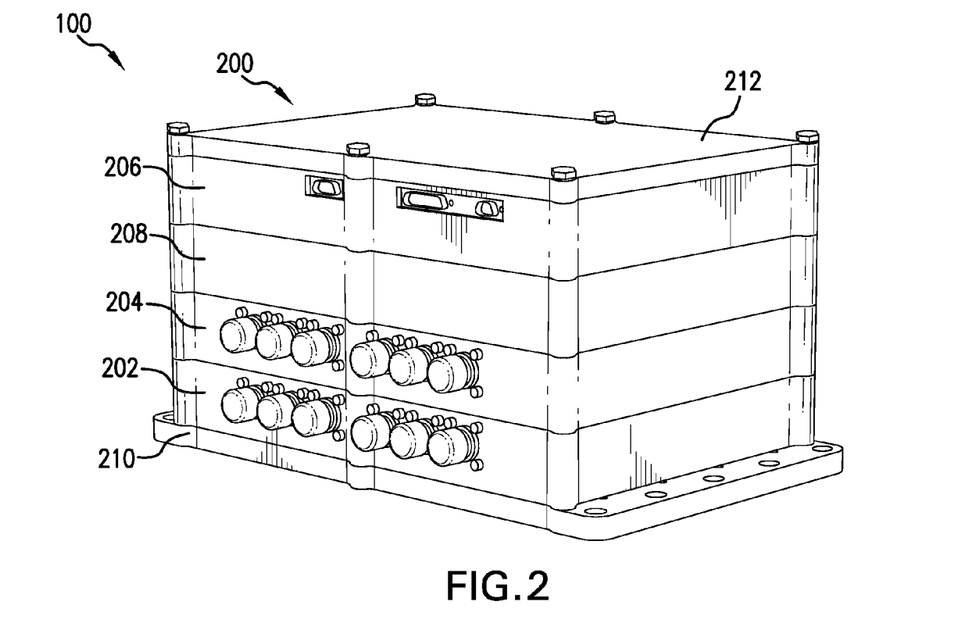
FIG. 2 is a perspective view of the MIPS of FIG. 1, in an embodiment.
Figure 3:
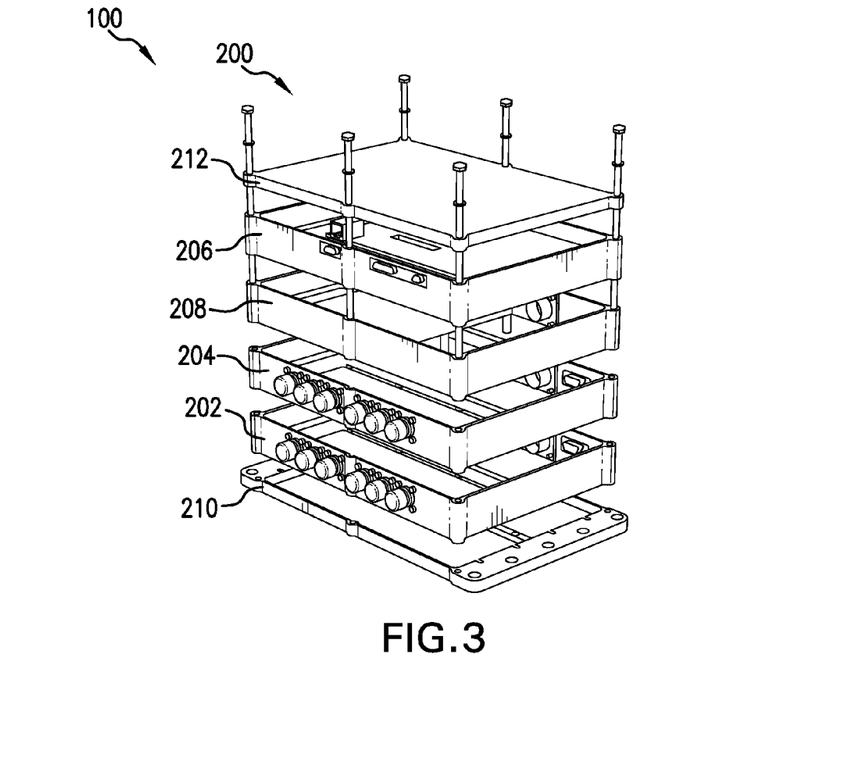
FIG. 3 is an exploded view of the MIPS of FIG. 2, illustrating modular construction.

FIG. 2 is a perspective view illustrating an example of a configurable structure 200 for housing MIPS 100 of FIG. 1. FIG. 3 is an exploded view of configurable structure 200 of FIG. 2 and MIPS 100 of FIG. 1, illustrating modular construction of configurable structure 200. FIGS. 2 and 3 can be viewed together according to the following description.

In the example of FIGS. 2 and 3, configurable structure 200 of MIPS 100 is shown with a deployment switching module ring 202, a power switching module ring 204, a telemetry interface module ring 206, and a LV interface ring 208, that are stacked on a MIPS mounting plate 210 and closed with a lid 212. Mounting plate 210 provides a standard mechanical interface, either directly to LV 120 or to an additional mounting fixture that the LV may employ to carry a multiplicity of payloads. The rings 202-208 for each module may be instantiated in a given MIPS configuration in any assembly order for maximum configuration flexibility of MIPS 100. As shown in FIG. 3, assembly is accomplished by simply stacking modules mounted in rings 202-208, and completed with single lid 212 using mounting bolt hardware that is sized to accommodate the number of rings 202-208 in a given configuration. Configurable structure 200 may incorporate more or fewer of each ring 202-208 based upon desired functionality of MIPS 100.

Figure 4:
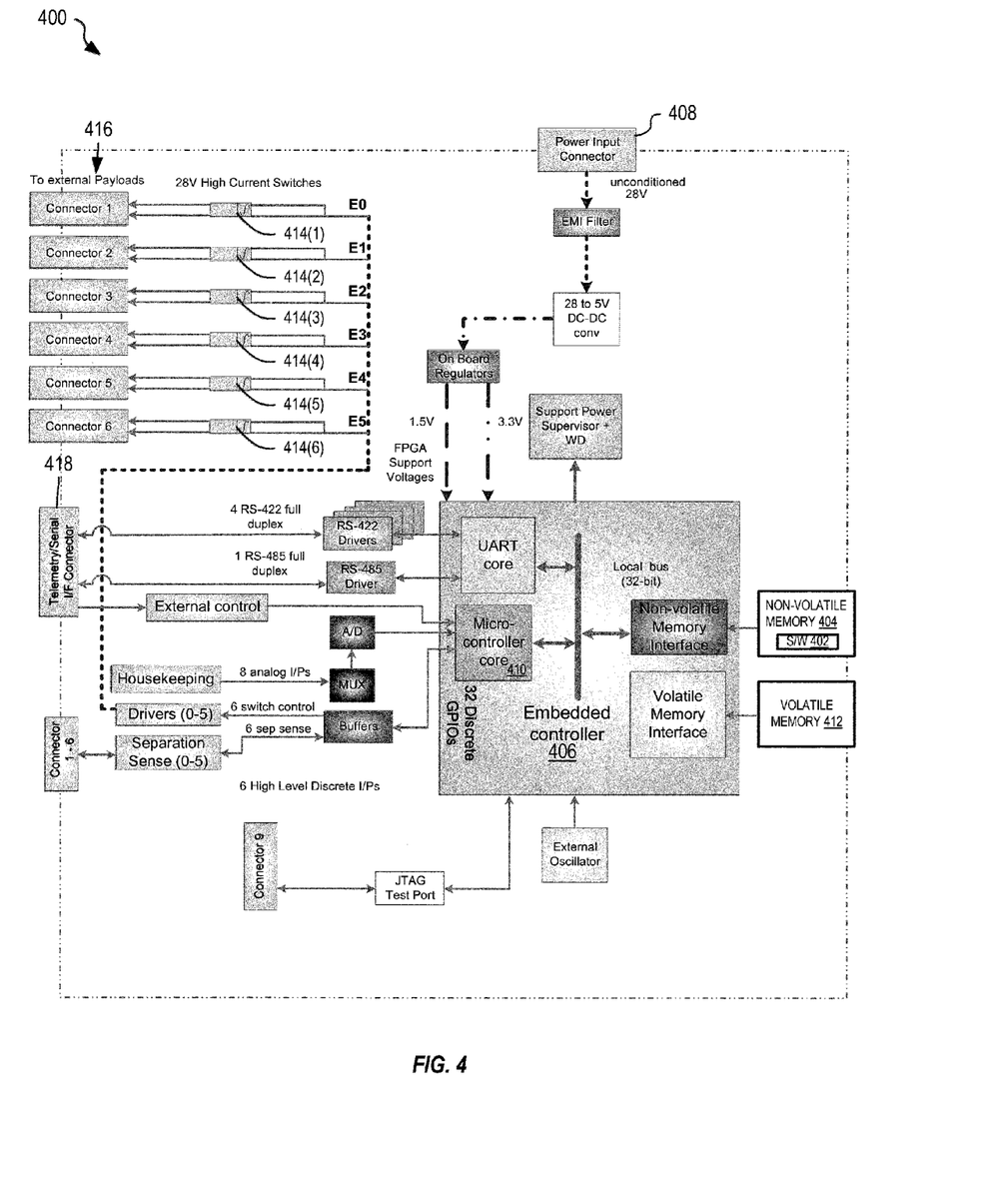
FIG. 4 is a schematic illustrating an example of electronics of the deployment switching module of the MIPS of FIGS. 1, 2, and 3, in an embodiment.

FIG. 4 is a schematic illustrating examples of electronics 400 of deployment switching module 108 of FIG. 1. Deployment of secondary payloads 140 may be managed by software 402 instantiated pre-flight within non-volatile memory 404 of an Embedded Controller 406. Once the primary payload has been deployed and power is provided to deployment switching module 108 via a Power Input Connector 408 from LV 120, a microcontroller 410 may execute software 402 to manage sequencing and timing of deployment events for secondary payloads 140. These deployment events may be triggered at times specified by software 402, loaded from non-volatile memory 404 when power is applied and executed by microcontroller 410 within embedded controller 406, which may make use of volatile memory 412 for additional data storage as needed.

The deployment events may be performed through changes in state of discrete GPIOs that may be dedicated to interfacing with deployment hardware of secondary payloads 140. High current drive of the deployment hardware may be achieved via high current switch drivers 414(1)-(6) that provide 28 VDC to each of the external Payload connectors 416, in an embodiment. Deployment switching module 108 may have a Telemetry/Serial I/F connector 418 that couples with telemetry module 104. The need for telemetry from deployment switching module 108 is mission dependent, but in mission scenarios where telemetry is required, telemetry from deployment switching module 108 may be advantageously included in a combined MIPS telemetry stream provided to LV 120 via telemetry module 104, according to the present embodiments.

Figure 5:
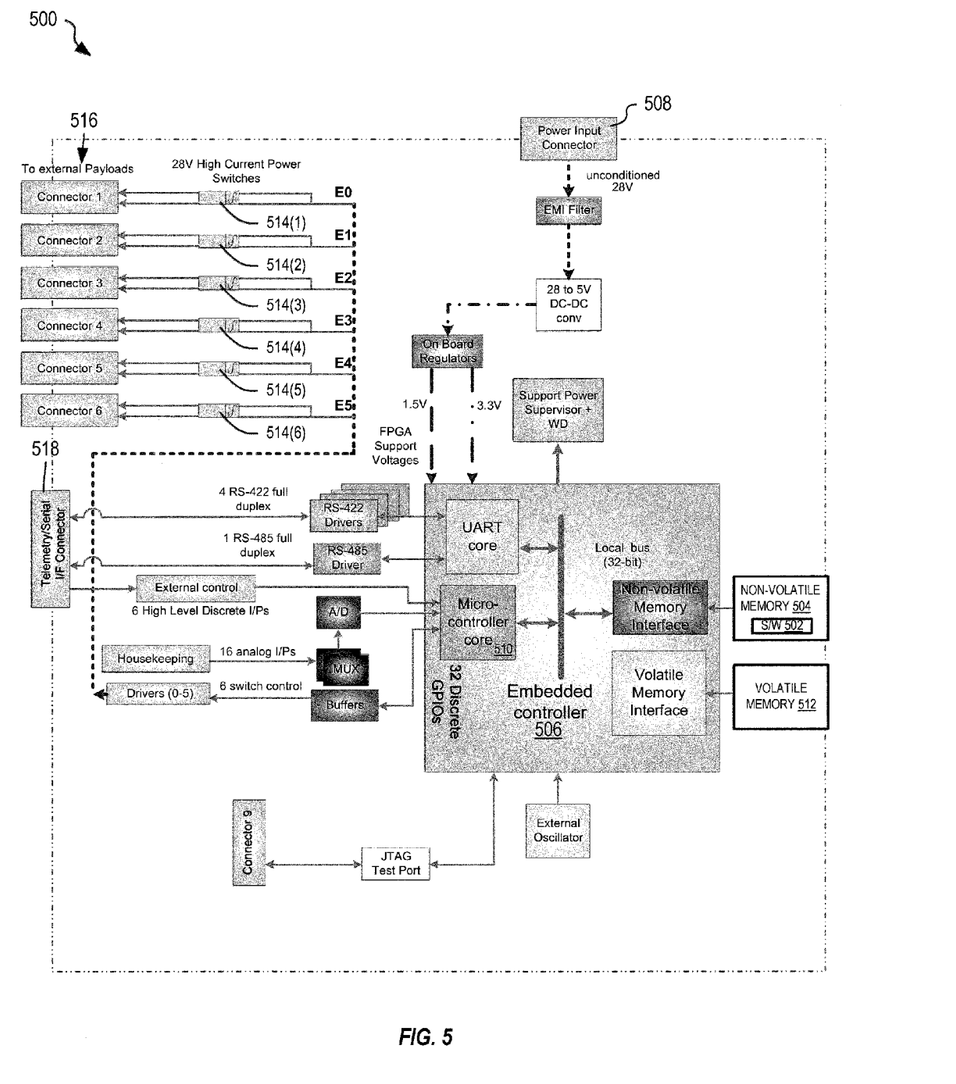
FIG. 5 is a schematic illustrating examples of electronics of the power switching module of the MIPS of FIGS. 1, 2, and 3, in an embodiment.

FIG. 5 is a schematic illustrating examples of electronics 500 of power switching module 106 of FIG. 1. Electronics 500 is shown with an embedded controller 506, that has software 502 instantiated pre-flight within non-volatile memory 504. Upon powering power switching module 106, via Power Input Connector 508 from LV 120, software 502, executed by microcontroller 510 of Embedded Controller 506 manages switching of 28 VDC power to one or more secondary payloads 140, through payload connector interfaces 516 and 28V high current switches 514(1)-(6). Power may be required by secondary payloads for a number of uses other than deployment, and for all of such non-deployment uses, power may be provided by power switching module 106. Telemetry related to events of power switching module 106 may be provided through a Telemetry/Serial Interface connector 518 that electrically couples with telemetry module 104, whereby telemetry from power switching module 106 may be incorporated into a combined TM telemetry stream, if PSM telemetry is desired for a given mission scenario.

Figure 6:
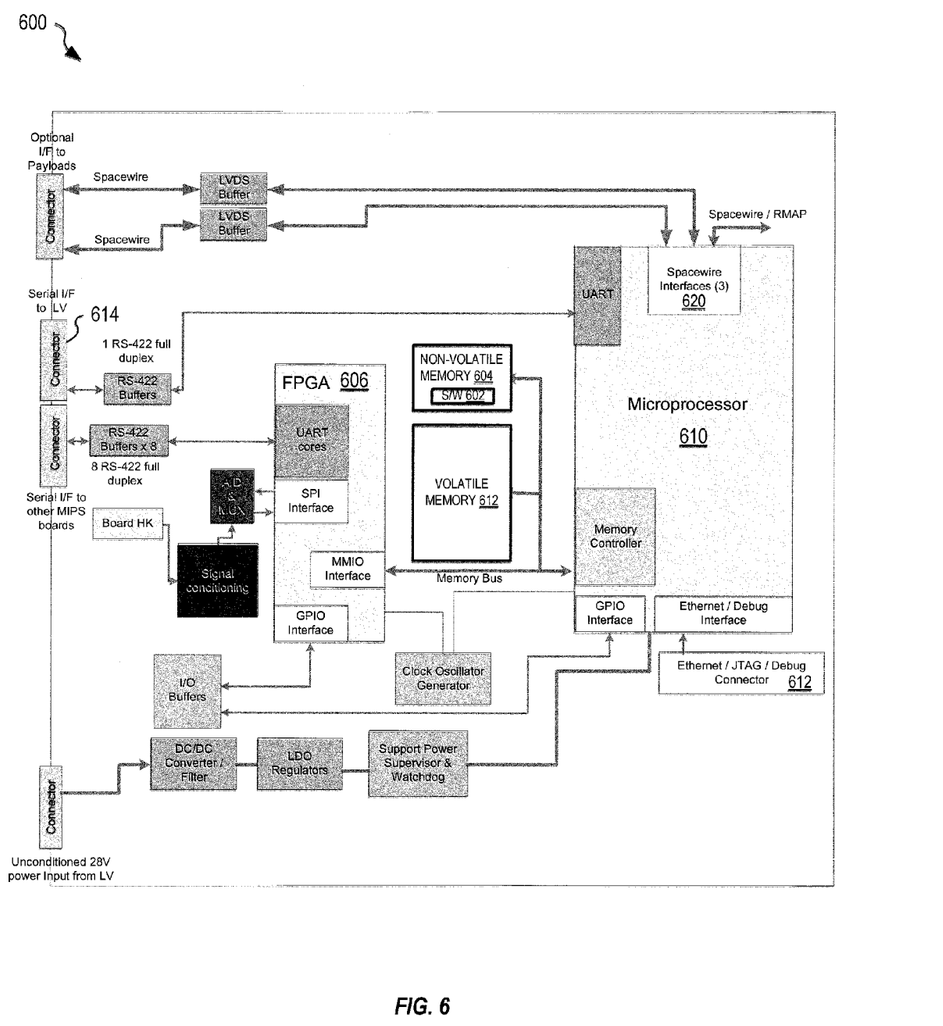
FIG. 6 is a schematic illustrating examples of electronics of the telemetry module of the MIPS of FIGS. 1, 2, and 3, in an embodiment.

FIG. 6 is a schematic illustrating examples of electronics 600 of telemetry module 104 if FIG. 1. Telemetry module 104 may include a microprocessor 610 and a variety of data interfaces implemented within an FPGA 606 that allow data communication between telemetry module 104 and other modules installed within MIPS 100 of FIG. 1. FPGA 606 also provides a LV Serial Interface 614 to LV 120. Software 602 is loaded into non-volatile memory 604 prior to flight via an Ethernet/JTAG/Debug connector 612, and may be executed within microprocessor 610 to manage the exchange of commands and data with other modules 104, 106, within MIPS 100. Software 602 may operate to format a combined MIPS telemetry stream for transfer to LV 120 via LV Serial Interface 614.

Software 602 instantiated in telemetry module 104 may advantageously support simultaneous asynchronous serial interfaces with up to six secondary payloads 140, as well as a separate high speed serial interface capability 620, via SpaceWire, for example, for two payloads that may require higher data transfer rates than achieved with RS-422. Telemetry module 104 may provide one synchronous, or two asynchronous, serial telemetry interfaces to LV 120, through a common standard hardware connection of LV interface 110. Software 602 may provide user-selectable and configurable scheduling algorithms to allow flexible multiplexing of different payload data queues, in turn accepting packets from each payload interface, once per queue cycle, in a priority order established by a user selectable prioritization function. Multiple prioritization functions may be further advantageously implemented according to the present embodiments, including simple Round Robin, Data Volume, Packet Length, Packet Quantity, and a provision for a user-definable prioritization scheme. Such advantageous flexibility may thus be made available to a user, since different data prioritization schemes provide different benefits as well as different constraints. Accordingly, in advance of a flight, the user may select a prioritization scheme most desirable to a particular mission scenario.

Data from telemetry module 104 for transfer to LV 120 may include one or more payload data packets, as well as system housekeeping data. Such data may be formatted in CCSDS standard payload packets, with a Proprietary Secondary Header and a user-customizable sync word that allows easy user de-multiplexing and extraction of telemetry data from telemetry module 104 within the complete LV data stream.

Telemetry module 104 data handling capabilities may be further configurable by a user via an XML interface to telemetry module 104. Configuration parameters addressable in XML by the user pre-flight include, but are not limited to, Payload Channel port definitions, LV interface port definitions, payload to LV port mapping, and system scheduling, as well as specification of maximum data queue size on a per payload basis.

The electronic modules (e.g., electronics 400, 500, and 600) employed in MIPS 100 may be each designed to fit within a common external ring format (e.g., rings 202-208), to maximize the arrangement flexibility of modules to support all envisioned mission scenarios. Likewise, commonality of electronic component and assembly design is preserved to the maximum extent possible, to minimize the cost of production of individual deployment switching modules 108 and power switching modules 106. For example, although the modules may be separate with separate functions, and each may be incorporated into a mission configuration independent of the other, commonality of design between deployment switching modules 108 and power switching modules 106 allows these modules to be fabricated, tested, and integrated far more quickly and efficiently than if the designs were significantly different from one another.

Changes may be made in the above methods and systems without departing from the scope hereof. It should thus be noted that the matter contained in the above description or shown in the accompanying drawings should be interpreted as illustrative and not in a limiting sense. The following claims are intended to cover generic and specific features described herein, as well as all statements of the scope of the present methods and systems, which, as a matter of language, may be said to fall therebetween.

What is claimed is:

1. A system adapted to interface an expendable, unmanned, orbital launch vehicle to a first plurality of secondary payloads, for enabling flexible configuration of secondary payloads, comprising:
    a single interface, consistent for a second plurality of missions, adapted for coupling to the launch vehicle interface for coupling with the launch vehicle to receive power, multiplex command and data communication, and receive a single deployment trigger signal from the launch vehicle, the system adapted for coupling to the first plurality of secondary payloads;
    for each of the plurality of secondary payloads:
        a configurable secondary payload interface adapted for providing power to, and for receiving telemetry from, the secondary payload, and for providing a secondary payload-specific deployment signal;
        and;
    a deployment switching module, electrically coupled with the launch vehicle interface to receive the single deployment signal, configured to provide the secondary payload-specific deployment signals to deploy the plurality of secondary payloads in a predefined deployment sequence in response to the single deployment signal;
    wherein the single consistent launch vehicle interface is invariant irrespective of the number of secondary payloads; and
    wherein the deployment switching module automatically provides a predetermined sequence of payload-specific deployment signals upon receiving the deployment trigger signal.

2. The system of claim 1, further comprising a telemetry module, electrically coupled with the launch vehicle interface, for sending telemetry from each of the plurality of secondary payloads to avionics of the launch vehicle via the single consistent launch vehicle interface.

3. The system of claim 1, further comprising a power switching module, electrically coupled with the launch vehicle interface, for distributing power to each of the plurality of secondary payloads from the launch vehicle interface.

4. The system of claim 1, the deployment switching module further comprising programmed deployment times for deploying the plurality of secondary payloads.

5. The system of claim 1, further comprising a video multiplexing module adapted to receive a video signal from each secondary payload and to provide a multiplexed video signal to the launch vehicle interface.

6. A method for interfacing a plurality of secondary payloads to an expendable launch vehicle, comprising the steps of:
    coupling a Multiple Interface Payload Subsystem (MIPS) to a single consistent launch vehicle interface to receive power, communicate commands and data, and to receive a single deployment signal and provide telemetry including multiplexed video from a plurality of the secondary payloads;
    coupling each of the plurality of secondary payloads to a different secondary payload interface of MIPS;
    configuring the MIPS to support each of the plurality of secondary payloads from the single consistent launch vehicle interface; and deploying all of the plurality of secondary payloads using a predefined sequence and schedule in response to the single deployment signal.

7. The method of claim 6 wherein the predefined sequence and schedule comprises programmed deployment times the programmed deployment sequence and schedule executed upon the MIPS.

8. The method of claim 6 further comprising:
receiving a single deployment signal from the launch vehicle; and
automatically generating a configurable sequence of secondary-payload-specific deployment signals and providing the secondary-payload-specific deployment signals to the plurality of secondary payloads after receiving the single deployment signal.

9. The method of claim 8, wherein the MIPS provides power to each of the plurality of secondary payloads from the single consistent launch vehicle interface.

10. The method of claim 8, wherein the MIPS receives telemetry from each of the plurality of secondary payloads and sends the telemetry as a single stream to the launch vehicle via the single consistent launch vehicle interface.

* * * * *